July 26, 1938. C. H. SPECHT 2,124,799
REINFORCEMENT FOR GLASS BLOCK STRUCTURES
Filed Nov. 1, 1937 2 Sheets-Sheet 1
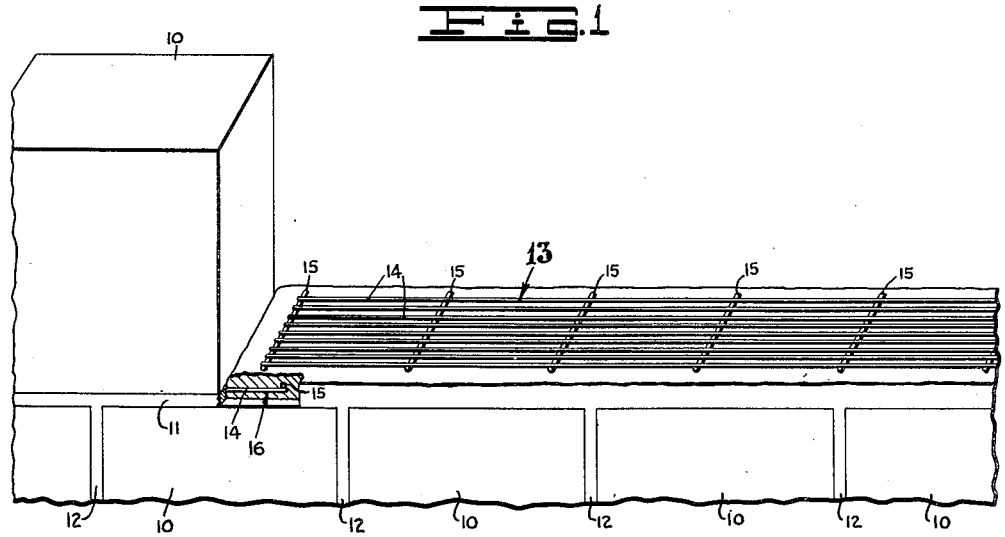
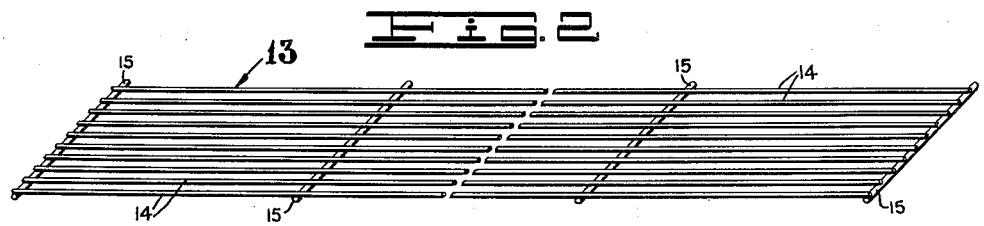
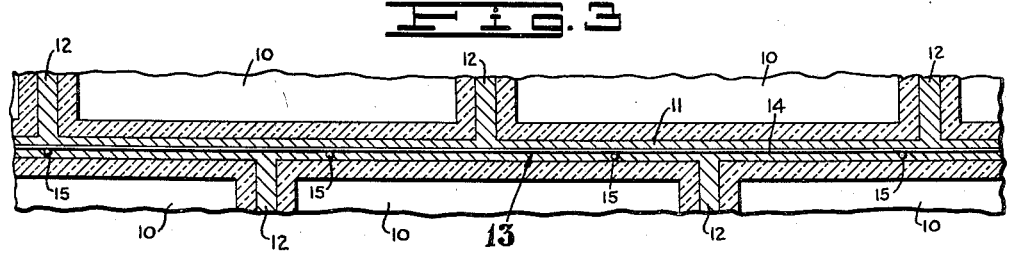
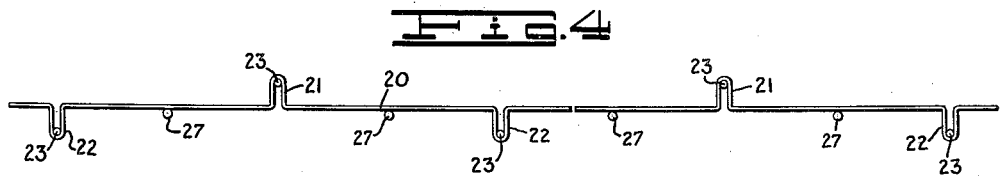
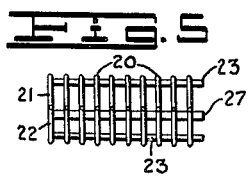
INVENTOR.
C. H. Specht.
BY
ATTORNEY.

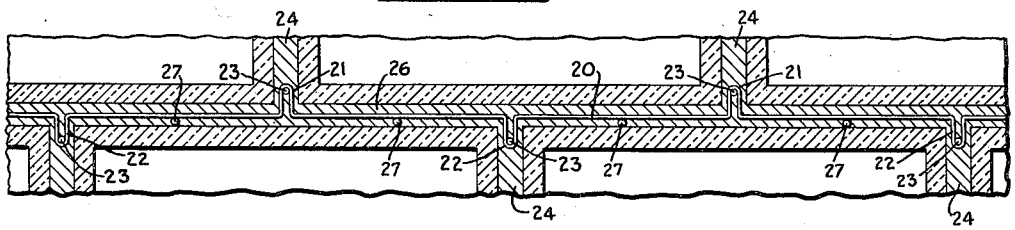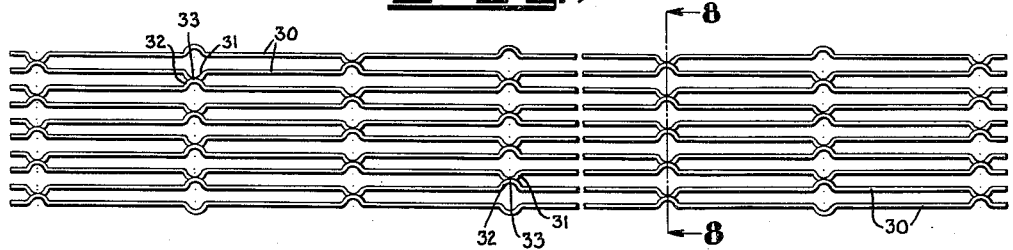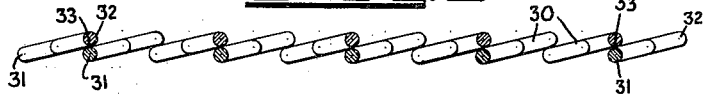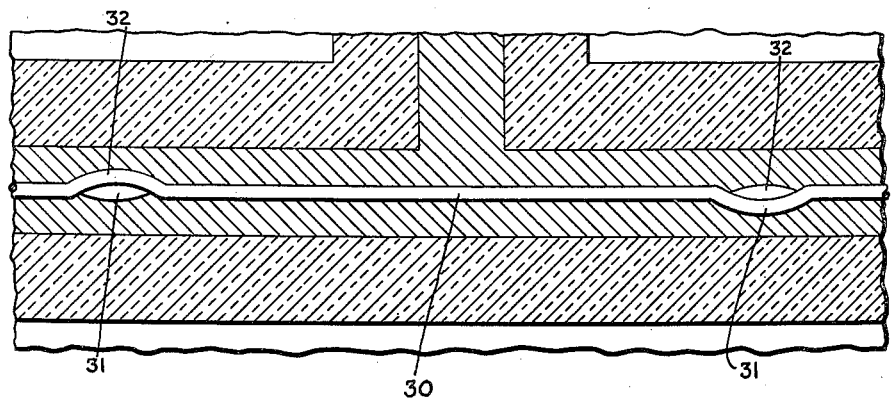

Patented July 26, 1938

2,124,799

UNITED STATES PATENT OFFICE 2,124,799

REINFORCEMENT FOR GLASS BLOCK STRUCTURES

Christian H. Specht, Los Angeles, Calif.

Application November 1, 1937, Serial No. 172,155

8 Claims. (Cl. 72—103)

This invention relates to a reinforcing member for glass building blocks.

The general object of the invention is to provide an improved reinforcing member adapted to be embedded in the mortar bed between glass building blocks.

A more specific object of the invention is to provide an elongated, resilient, reinforcing member made of welded wire members for employment in the mortar beds between glass building blocks and for similar purposes.

Another object of the invention is to provide a metal reinforcement including longitudinally extending wire members which are united in a novel manner to provide a reinforcement.

A further object of my invention is to provide a novel building structure including unitary blocks united in a novel manner.

Other objects and the advantages of my invention will be apparent from the following description taken in connection with the accompanying drawings, wherein:

Fig. 1 is a perspective view, partly in section, showing a portion of a glass block structure with my improved reinforcing member therein;

Fig. 2 is a fragmentary perspective view of the reinforcing member;

Fig. 3 is a sectional view through a structure made of glass blocks and showing my invention;

Fig. 4 is a fragmentary side elevation showing a modification of my invention;

Fig. 5 is an end view of the device shown in Fig. 4;

Fig. 6 is a view similar to Fig. 3 showing the use of the modification;

Fig. 7 is a fragmentary top plan view showing a further modification of my invention;

Fig. 8 is a section taken on line 8—8 Fig. 7; and

Fig. 9 is a fragmentary, enlarged section through a wall showing the further modification disposed in a mortar bed.

Referring to the drawings by reference characters I have shown my invention as used in conjunction with a structure made from glass building blocks which are indicated generally at 10. These blocks 10 are preferably rectangular in shape and are laid staggered in horizontal and vertical mortar beds 11 and 12. The reinforcement embodying the features of my invention is indicated generally at 13 and as shown includes longitudinally extending wire members 14 and transverse wire members 15. These members 14 and 15 are preferably made of a suitable grade of steel which is resilient so that the members can be somewhat deformed and still retain their shape.

The rods 14 are connected at intervals to the transverse members 15 preferably by spot welding at each point of intersection. The transverse members 15 are preferably spaced apart a distance less than the length of the blocks with which they are used and are preferably made of a larger size of wire than the longitudinal members 14 as clearly shown in Fig. 2.

In use the blocks 10 are laid as shown in Fig. 1 and the mortar is preferably distributed in the usual manner as with a trowel. The reinforcing member 13 may be arranged on the mortar bed as shown at the right in Fig. 1 and then lightly pressed to the position shown at 16 at the left in Fig. 1.

In the accompanying drawings the reinforcing members are shown as reversed. For instance in the completed joints shown at the left in Fig. 1 the reinforcement is placed so that the transverse member 15 is disposed above the longitudinal members 14 while in the joint shown being formed at the right the transverse member 15 is below the longitudinal members 14. The members 13 are preferably brought together with the end members 15 slightly spaced apart so that they will not pull against each other during extreme contraction due to temperature changes. The reverse disposition of the members 15 prevents the reinforcements from being accidentally displaced while the blocks are being laid in the mortar bed and lightly tamped to position.

In Figs. 4, 5 and 6 I show a modification of my invention wherein the longitudinally extending members 20 are provided with upwardly extending loops 21 and downwardly extending loops 22 and transverse wires 23 are disposed within the loops 21 and 22 and are there welded. As shown in Fig. 6 the loops 21 and 22 are disposed apart a distance equal to the length of the blocks plus the thickness of the vertical mortar beds 24 and as a result the loops together with their transverse members 23 extend into the vertical mortar beds 24 while the longitudinal portions between the loops are disposed in the horizontal mortar beds 26. In addition to the transverse wires 23 I employ other transverse wires 27 which are larger than the longitudinal wires 20 and which are welded to the longitudinal wires 20 and disposed between the loops 21 and 22. There is thus provided a vertical reinforcement as well as a horizontal reinforcement which is desirable in certain installations.

In Figs. 7, 8 and 9 I show a further modification of my invention wherein spaced longitudinally extending wire members 30 are provided with semi-circular loops 31 and 32 with the loops 31 directed in one direction and with alternate loops 32 extending in an opposite direction. The loops 31 of one wire are all united as at 33 with the loop 32 of the adjacent wire as by spotted welding so that the added stiffness occasioned by the semi-circular portions 31 and 32 aids in providing a strong reinforcing member from light wire and also affords means for welding the wires 30 so that they are spaced apart. The construction also is such that the wires are not disposed in a single plane but are in a series of inclined planes as shown in Fig. 8 so that the strength of the mortar bed is increased while the flexibility of the joint is not impaired in any way.

The use of the device shown in Figs. 4 to 9 inclusive and the manner in which they are laid will be apparent from the description given in connection with the device shown in Figs. 1, 2 and 3.

From the foregoing description it will be apparent that I have invented a novel reinforcement for glass building blocks which can be economically manufactured and which is highly efficient for the intended purpose.

Having thus described my invention I claim:

1. A reinforcing member comprising a plurality of longitudinal lengths of resilient wire arranged in parallel relation, said wires being of uniform diameter and a plurality of transverse wires larger than said longitudinal wires and extending across the longitudinal wires, said wires being welded together at their points of intersection.

2. A reinforcing member comprising a plurality of lengths of wires arranged in parallel relation, and a plurality of transverse wires extending across the longitudinal wires, said wires being welded together at their points of intersection, said longitudinal wires having loops therein, and a transverse wire welded to the looped portions.

3. A reinforcing member comprising a plurality of lengths of resilient wires arranged in parallel relation, said wires being of uniform diameter, and a plurality of transverse wires larger than said longitudinal wires and extending across the longitudinal wires, said wires being welded together at their points of intersection, said longitudinal wires having loops therein, certain of said loops being in alignment and extending away from the longitudinal wires and other of said loops being in alignment and extending away from the longitudinal wires in a direction opposite to that of said certain loops.

4. A reinforcing member comprising a plurality of lengths of resilient wires arranged in parallel relation, said wires being of uniform diameter, and a plurality of transverse wires larger than said longitudinal wires and extending across the longitudinal wires, said wires being welded together at their points of intersection, straight longitudinal wires having loops therein, certain of said loops being in alignment and extending away from the longitudinal wires and other of said loops being in alignment and extending away from the longitudinal wires in a direction opposite to that of said certain loops and transverse wires welded in the bottom of the aligned loops.

5. A building structure comprising glass blocks arranged in horizontal course with the vertical joints in adjoining courses staggered with mortar beds between the blocks and a wire reinforcement comprising parallel longitudinal and parallel transverse members welded to the longitudinal members, said reinforcement being disposed in the horizontal mortar bed and including upwardly and downwardly loops extending into the vertical mortar beds.

6. In a reinforcement, a plurality of parallel wires, each of said wires having loops extending from opposite sides thereof, the loops of adjacent wires being welded together.

7. In a reinforcement, a plurality of wires, each of said wires having loops extending therefrom, the alternate loops all extending in one direction and the intermediate loops extending in an opposite direction, the ends of the loops of adjacent wires being superimposed and welded together.

8. A reinforcing member comprising a plurality of longitudinal lengths of wires arranged in parallel relation, and a plurality of transverse wires extending across the longitudinal wires, said wires being welded together at their points of intersection, said longitudinal wires having spaced looped portions therein.

CHRISTIAN H. SPECHT.